United States Patent [19]

Grube et al.

[11] Patent Number: 5,581,803
[45] Date of Patent: Dec. 3, 1996

[54] METHOD OF PROGRAMMING A RADIO IDENTIFICATION CODE IN A COMMUNICATION UNIT

[75] Inventors: Gary W. Grube, Palatine; Timothy W. Markison, Hoffman Estates; Susan L. Lukasik, Lombard, all of Ill.

[73] Assignee: Motorola, Inc., Schaumburg, Ill.

[21] Appl. No.: 230,989

[22] Filed: Apr. 21, 1994

[51] Int. Cl.$^6$ .................................................. H04B 7/00
[52] U.S. Cl. .................................... 455/54.1; 455/70
[58] Field of Search ........................ 455/33.4, 54.1, 455/89, 33.1, 70, 69; 340/825.34, 825.31; 379/58, 59

[56] References Cited

U.S. PATENT DOCUMENTS

| | | | |
|---|---|---|---|
| 4,742,560 | 5/1988 | Arai | 455/54.1 |
| 4,890,315 | 12/1989 | Bendixen et al. | 379/59 |
| 5,014,345 | 5/1991 | Comroe et al. | 455/54.1 |
| 5,237,612 | 8/1993 | Raith | 379/59 |
| 5,280,650 | 1/1994 | Sobti | 455/343 |
| 5,282,250 | 1/1994 | Dent et al. | 340/825.34 |
| 5,293,644 | 3/1994 | Barry et al. | 455/54.1 |
| 5,296,849 | 3/1994 | Ide | 455/343 |
| 5,301,234 | 4/1994 | Mazziotto et al. | 455/33.1 |
| 5,319,711 | 6/1994 | Servi | 340/825.31 |
| 5,335,278 | 8/1994 | Matchett et al. | 455/33.1 |
| 5,337,345 | 8/1994 | Cassidy et al. | 455/33.1 |
| 5,343,529 | 8/1994 | Goldfine et al. | 380/23 |
| 5,345,595 | 9/1994 | Johnson et al. | 455/33.1 |
| 5,371,793 | 12/1994 | Kimura | 340/825.34 |

OTHER PUBLICATIONS

Webster's New World Dictionery Of Computer Terms (Third Edition).
Electronics Engineers' Handbook (Third Edition).
Computer Dictionary and Handbook by Charles J. Sippl.
IEEE Standard Dictionary of Electrical and Electronics Terms (Third Edition).

*Primary Examiner*—Edward F. Urban
*Attorney, Agent, or Firm*—Susan L. Lukasik

[57] ABSTRACT

An identification (ID) code (204) in a memory slot (203) within a communication unit (200) is programmable only through a received RF message and a valid trigger for programming the memory slot (203). No other connection to the radio, such as a standard programming port (206), is capable of being used to program the memory slot (203). An ID code (204), such as a security ID, is programmed via an RF message. The ID code (204) is a special code known to a communication system. No request for a communication resource is granted to a communication unit (200) that does not have the ID code (204), thereby keeping unauthorized users from gaining access to the communication system.

13 Claims, 3 Drawing Sheets

METHOD OF PROGRAMMING A RADIO IDENTIFICATION CODE IN A COMMUNICATION UNIT

FIELD OF THE INVENTION

This invention relates to wireless communications, including but not limited to, wireless, radio frequency (RF) programming of information in a communication unit.

BACKGROUND OF THE INVENTION

Programming of wireless communication units, such as RF radios, is known. Such a procedure is often performed through a port on the side of the wireless communication unit. Such reprogramming includes reprogramming of frequencies, channel capabilities, top groups, and radio ID's, to name a few. Without these parameters, a communication unit cannot effectively communicate within a communication system. This information is often transmitted to a microprocessor within a communication unit, which programs the information into a memory device within the communication unit. This information is then accessed by the microprocessor for access to a communication system.

Unfortunately, there are unscrupulous individuals who, for whatever reason, do not feel that they should pay for such services, and have found ways to program radio system information into a radio without either paying for that software, or paying for the access that is provided by such software being programmed into a radio. Such perfidiousness, results in untold problems for an honest, paying customer within a legitimate communication system. An honest, paying customer is harmed in many ways, including that he may have to wait to use a communication resource, such as a frequency, frequency pair, TDM (time division multiplexed) time slot, and so forth, because someone else who has not paid for the resource is using that resource in his place. Because such resources are scarce, this creates the problem in that added traffic and congestion appear within the system. Further, maintenance costs are spread over only the paying users within a system, and the dishonest users do not pay their fair share for upgrade and upkeep of the system, which they are so freely enjoying. Accordingly, there is a need for a method and apparatus for programming such radio information into a communication unit such that unpaying users may not gain access to a communication system.

DESCRIPTION OF A PREFERRED EMBODIMENT

Figure 1:
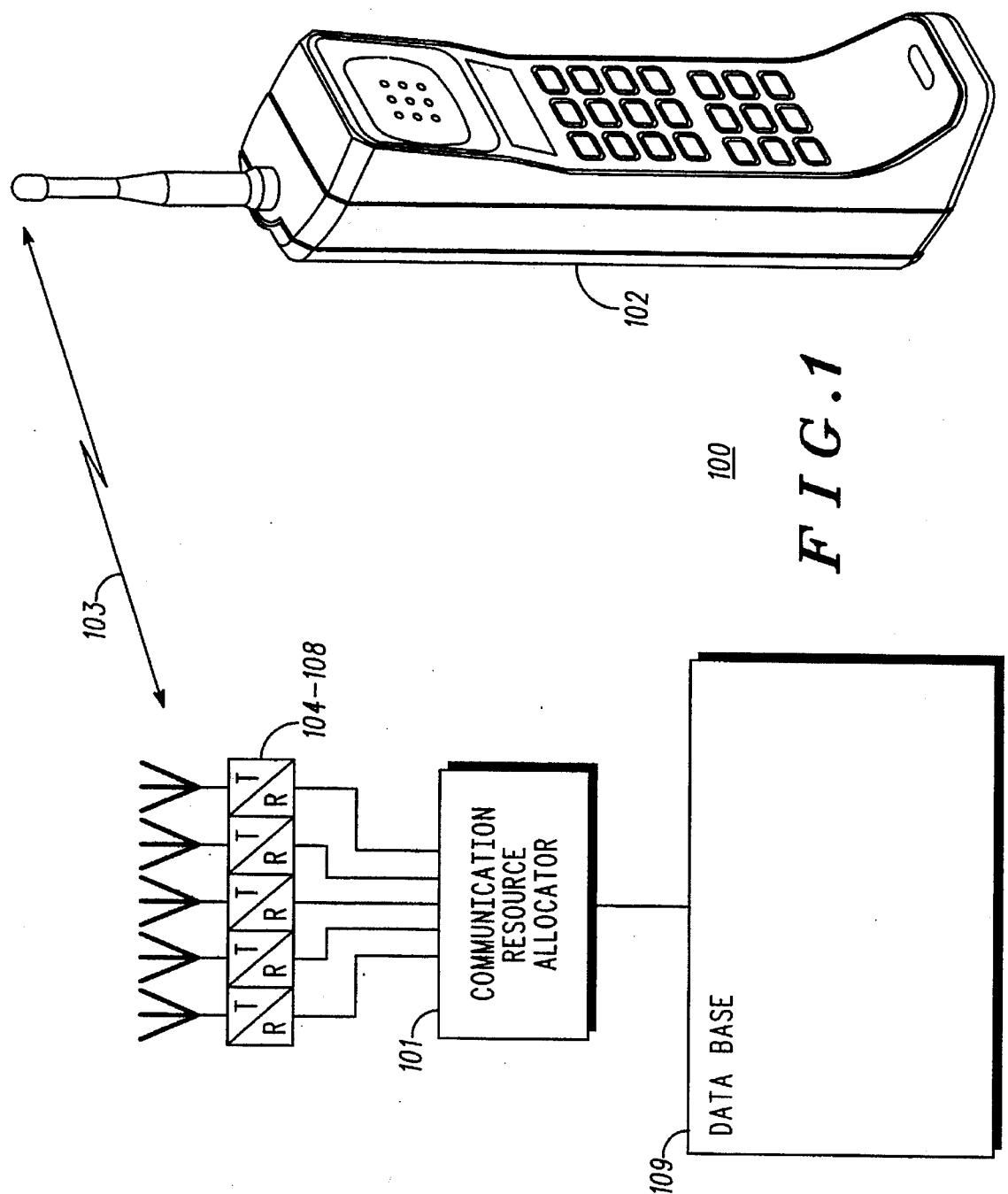
FIG. 1 is a block diagram of a secure communication system in accordance with the invention.

The following describes an apparatus for and method of programming a radio identification code in a communication unit. An identification (ID) code in a memory slot within a communication unit is programmable only through a received RF message and a valid trigger for programming the memory slot. No other connection to the radio, such as a standard programming port, is capable of being used to program the memory slot. An ID code, such as a security ID, is programmed via an RF message. The ID code is a special code known to a communication system. No request for a communication resource is granted to a communication unit that does not have the ID code, thereby keeping unauthorized users from gaining access to the communication system.

In the present invention, a wireless communication unit comprises a memory and a wireless receiver, wherein the wireless receiver receives at least a portion of an identification code of the communication unit. A first processor, operatively coupled to the receiver and the memory, has access to write the at least a portion of the identification code into the memory. A second processor, operably coupled to the memory, has read only access of the at least a portion of the identification code stored in the memory. The first processor may be a digital signal processor, and the second processor may be a host processor. System parameters memory may be operably coupled to the second processor.

A method of programming a radio identification code comprises the steps of receiving an RF message including a first unique radio ID code and a unique second radio ID code. A trigger is received prior to, or simultaneously with, the receiving the RF message. A determination is made as to whether the trigger is valid. A determination is made as to whether the first unique radio ID code matches a prestored unique radio ID code. When the trigger is valid and the first unique radio ID code matches the prestored unique radio ID code, the prestored unique radio ID code is replaced with the second unique radio ID code. A valid trigger may come from a determination that the signal strength of the trigger is within a prestored signal strength range or that the signal strength of the trigger varies with time. A prestored system ID code or an opcode may be received as at least part of the trigger. The prestored unique radio ID code may be overwritten with the second unique radio ID code.

Alternatively, a method of programming a radio identification code comprising the steps of receiving an RF message including a radio ID code and a system security ID code. A trigger is received prior to, or simultaneously with, the receiving the RF message. A determination is made as to whether the trigger is valid. A determination is made as to whether the radio ID code matches a prestored radio ID code. When the trigger is valid and the radio ID code matches the prestored radio ID code, the system security ID code is stored. The method may further comprise transmitting a service request. Upon receipt of the service request, a central controller determines whether the service request includes the system security ID code. When the service request does not include the system security ID code, the service request is denied.

Additionally, a second processor programs user information into a second memory element. An RF message is received, including an instruction to reprogram a first memory element with a security ID. A first processor stores the security ID in the first memory element. The second processor is prohibited write access to the first memory element.

FIG. 1 illustrates a block diagram of a communication system 100 that includes a communication resource allocator 101 (or central controller), a plurality of communication units 102 (one shown for simplicity), a plurality of communication resources 103 (one shown for simplicity), repeaters 104–108, and a database 109. In such a system, one of the repeaters 104–108 is designated as a control channel, while the remaining channels are designated as working channels. In operation, a communication unit 102 transmits a service request via a communication resource of the control channel to the central controller 101. Upon receiving the service request, the central controller 101 determines whether the communication unit is authorized to access the system and whether the communication unit has requested a service to which it has subscribed. If both of the previous inquiries are answered affirmatively, the central controller 101 processes the request. The communication unit may be a Motorola SABER radio, SPECTRA radio, or any other type of portable or mobile radio that operates within a communication system. The central controller 101 may be a Motorola Zone Controller, while the system manager may be a Motorola Smartzone Manager and the repeaters 104–108 may be Quantar repeaters.

Figure 2:
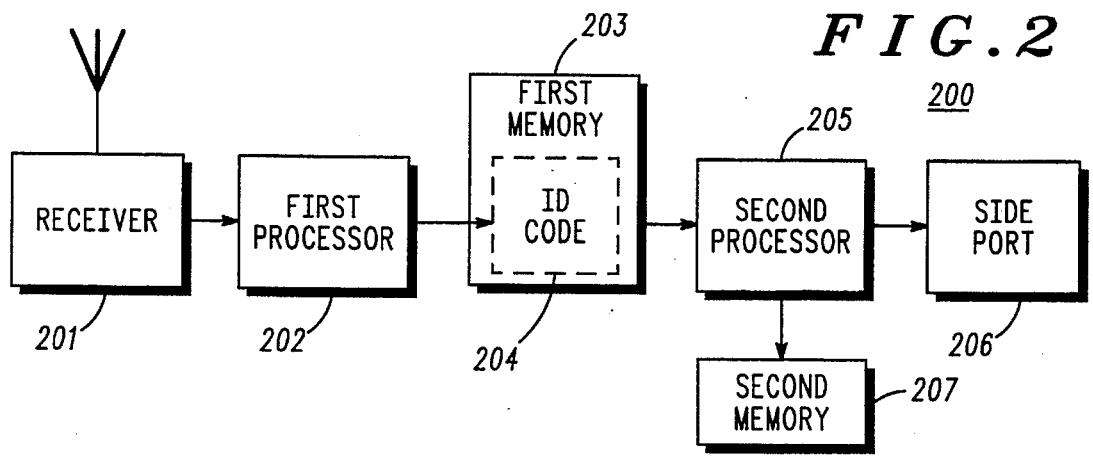
FIG. 2 is a block diagram of a wireless communication unit in accordance with the invention.

A block diagram of a wireless communication unit 200 is shown in FIG. 2. The wireless communication unit 200 includes a receiver 201. The wireless receiver 201 receives at least a portion of an identification (ID) code of the communication unit 200. The receiver 201 passes the information to a first processor 202, which is operatively coupled to the receiver 201 and a first memory 203. The first processor 202 has access to write at least a portion of an identification code of a communication unit 200 into the first memory 203. A second processor 205 is operably coupled to the first memory 203, and the second processor 205 has read-only access to the portion of the identification codes 204 stored in the first memory 203. The second processor 205 may be a host processor. The first processor 202 may be a digital signal processor (DSP). The second processor 205 is operatively coupled to a second memory 207, which may include system parameter memory. The first memory 203 that the first processor 202 has write access to may be a separate memory device than the other memory devices in the communication unit 200. The first memory 203 may be a shared device, where the write control is only accessed by the first processor 202, or certain address lines are only accessed by the first processor 202, thus limiting access to certain memory space to only the first processor 202. In this configuration, the first memory 203 and the second memory 207 may be inside the same physical device.

Figure 3:
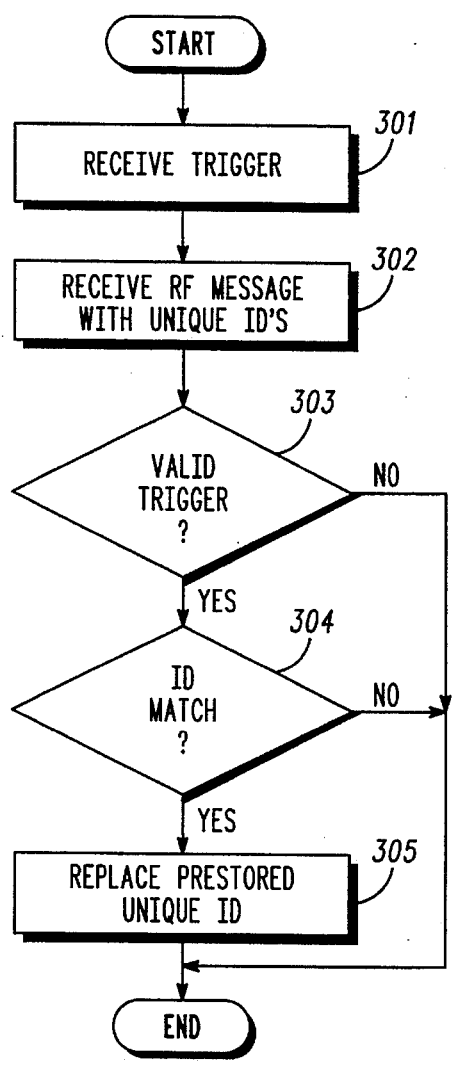
FIG. 3 is a flow chart showing a method of programming a radio ID in accordance with the invention.

A flow chart showing a method of programming a radio ID is shown in FIG. 3. At step 301, a trigger is received prior to, or simultaneously with, a radio frequency (RF) message. At step 302, the RF message is received, including a first unique radio ID code and a unique second radio ID code. At step 303, the communication unit 200 determines whether the trigger it received is a valid trigger. A valid trigger includes a finding of the signal strength of the trigger signal within a prestored signal strength range. In other words, the trigger may be a separate message, or may be the same message including the unique IDs, but the trigger message is sent with a particular signal strength that falls within a prestored signal strength range. For example, the prestored signal strength range may be −90 dBm to −110 dBm, and if a −60 dBm message is received, it is clearly not within the range that is a valid range, and hence the trigger will be determined to not be valid at step 303, and the process ends. The trigger may also require that the signal strength of the trigger signal varies with time, such as a requirement that the standard deviation of the signal strength may be, for example, above 0.5 dBm or 1 dBm within the entire message for that trigger to be considered a valid trigger. The trigger may also comprise an opcode as at least a part of the trigger, wherein the opcode designates that ID programming is desired.

At step 304, it is determined if the first unique radio ID code matches a prestored unique radio ID code within a communication unit 200. If there is no ID match at step 304, the process ends. If at step 304 the first unique radio ID code matches the prestored unique radio ID code, the process continues with step 305, where the prestored unique radio ID code is replaced with the second unique radio ID code from the RF message. In the preferred embodiment, the replacement step includes overwriting the prestored unique radio ID code with the second unique radio ID code, such that the prestored unique radio ID code is no longer available for use by the communication unit 200. Alternatively, the prestored unique radio ID code may simply be put to the side, e.g., stored elsewhere in the unit, for use at another time, if it is so desired by a system designer or manager. Nevertheless, the preferred embodiment overrides the prestored unique radio ID code for security purposes.

Figure 4:
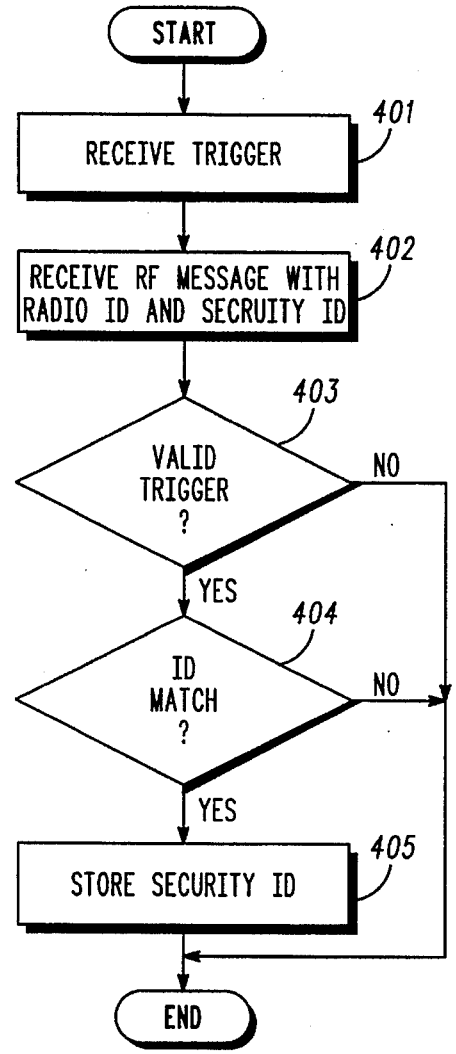
FIG. 4 is a flow chart showing reprogramming by RF message of a security ID in accordance with the invention.

A flow chart showing reprogramming by RF message of a security ID is shown in FIG. 4. At step 401, as with step 301, a communication unit 200 receives a trigger as described for step 301 of FIG. 3. At step 401, an RF message is received, that message including a radio ID code and a system security ID code. At step 403, the communication unit 200 determines if the trigger of step 401 was a valid trigger, as described in step 303 of FIG. 3. If that trigger is not valid at step 403, the process ends. If the trigger at step 403 is a valid trigger, the process continues with step 404, where the unit determines if the radio ID code matches a prestored radio ID code within the unit. The process continues with step 405, when the trigger is valid and the radio ID code matches the prestored radio ID code, the system security ID code is stored in the communication unit 200 at step 405.

Figure 5:
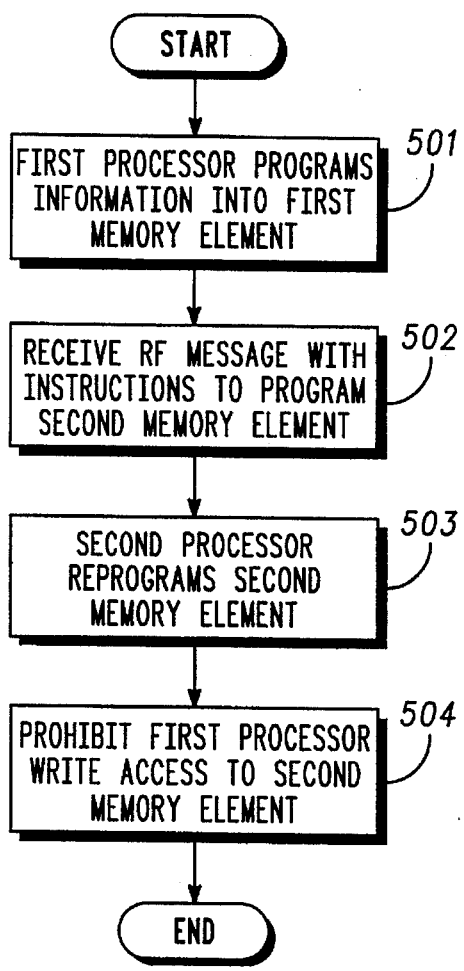
FIG. 5 is a flow chart showing communication unit programming by processors in accordance with the invention.

A flow chart showing communication unit 200 programming by processors is shown in FIG. 5. At step 501, the second processor 205 programs user information into the second memory element 207. This user information may be a talk group affiliation, channel frequencies, and so forth. At step 502, the communication unit 200 receives an RF message including an instruction to reprogram a first memory element 203 with a security ID. The first processor 202 stores the security ID in the identification code slot 204 in the first memory element 203 at step 503. At step 504, the second processor 205 is prohibited write access to the first memory element 203. Thus, because only programming through an RF message is possible for the identification code slot 204, placing the security ID in this slot adds to the security of the ID code, which is demonstrated in FIG. 6, as described below.

Figure 6:
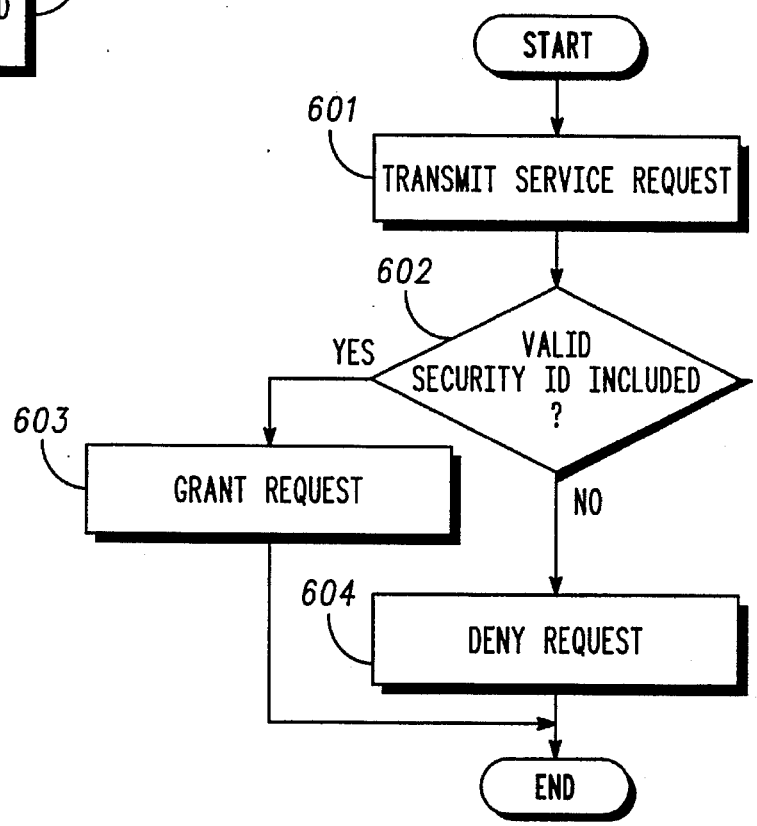
FIG. 6 is a flow chart showing processing of a service request in accordance with the invention.

A flow chart showing processing of a service request is shown in FIG. 6. At step 601, a communication unit 200 transmits a service request, which typically requests a communication resource within a communication system. If at step 602, a security ID is included in the service request, the grant is requested at 603, and the process ends. If at step 602, a security ID is not included in the service request, or the security ID that is included is not a valid security ID, the request is denied at step 604 and the process ends. A security ID may be a system wide code, which each communication unit 200 has, or the security ID may be a unique ID that is different for each communication unit 200 in the system. When the security ID is a unique ID, the unique ID may be used as the individual ID for the communication unit 200.

The present invention provides that only a communication unit 200 with a valid system security ID code may gain access to a communication system. Without knowledge of what this security code is, a communication unit 200 cannot be reprogrammed with this security ID. Further, because the information may only be obtained and stored by receiving an RF message, the information is not programmable through a side port of a communication unit 200. Because it is typically the first processor 205 that has access to the side port 206 of the communication unit 200, and because the first processor is denied write access to the identification or security code as may be placed in the memory 203, an unscrupulous programmer does not have the ability to reprogram the identification code that is necessary to gain access to a communication resource within a communication system.

What is claimed is:

1. A wireless communication unit comprising:
   a wireless receiver, wherein the wireless receiver receives a wireless message comprising at least a portion of a new identification code;
   memory, having a block allocated to storing a unique identification code of the communication unit;
   a first processor, operatively coupled to the wireless receiver and the memory, wherein the first processor has access to write to at least a portion of the block allocated to storing the unique identification code of communication unit;
   a second processor, operably coupled to the memory, wherein the second processor has read only access to the at least a portion of the block allocated to storing the unique identification code of the communication unit, wherein at least a portion of the new identification code is written into the at least a portion of the block allocated to storing the unique identification code of the communication unit only by the first processor upon receipt of the wireless message.

2. The communication unit of claim 1, wherein the second processor is a host processor.

3. The communication unit of claim 1, wherein the first processor is a digital signal processor.

4. The communication unit of claim 1 further comprises system parameters memory operably coupled to the second processor.

5. A method comprising the steps of:
   a) receiving, by a communication unit, a radio frequency (RF) message including a first unique radio identification (ID) code and a second unique radio ID code;
   b) receiving a trigger prior to, or simultaneously with, the receiving of the RF message;
   c) determining whether the trigger is valid;
   d) determining whether the first unique radio ID code matches a prestored unique radio ID code; and
   e) when the trigger is valid and the first unique radio ID code matches the prestored unique radio ID code, replacing, in the communication unit, the prestored unique radio ID code with the second unique radio ID code.

6. The method of claim 5, wherein step (c) further comprises determining that signal strength of the trigger is within a prestored signal strength range.

7. The method of claim 5, wherein step (c) further comprises determining that signal strength of the trigger varies with time.

8. The method of claim 5, wherein step (b) further comprises receiving a prestored system ID code as at least part of the trigger.

9. The method of claim 5, wherein step (b) further comprises receiving an opcode as at least part of the trigger.

10. The method of claim 5, wherein further comprises the prestored unique radio ID code is replaced with the second unique radio ID code only after receiving the RF message and the valid trigger.

11. A method comprising the steps of:
    a) receiving, by a communication unit, a radio frequency (RF) message including a radio identification (ID) code and a system security ID code;
    b) receiving a trigger prior to, or simultaneously with, the receiving the RF message;
    c) determining whether the trigger is valid;
    d) determining whether the radio ID code matches a prestored radio ID code; and
    e) when the trigger is valid and the radio ID code matches the prestored radio ID code, storing the system security ID code in the communication unit, wherein the system security ID is stored in the communication unit only after receiving the RF message and the valid trigger.

12. The method of claim 11, further comprising the steps of:
    transmitting a service request;
    upon receipt of the service request, determining, by a central controller, whether the service request includes the system security ID code;
    when the service request does not include the system security ID code, denying the service request.

13. A method comprising the steps of:
    programming, by a second processor, user information into a second memory element;
    receiving by a communication unit, a radio frequency (RF) message including an instruction to reprogram a first memory element with a security identification(ID);
    processing, by a first processor, the RF message;
    storing, by the first processor in the communication unit, the security ID in the first memory element;
    prohibiting the second processor write access to the first memory element wherein the first memory element is written into only by the first processor upon receipt of the RF message.

* * * * *

UNITED STATES PATENT AND TRADEMARK OFFICE
CERTIFICATE OF CORRECTION

PATENT NO. : 5,581,803
DATED : December 3, 1996
INVENTOR(S) : Gary W. Grube, Timothy W. Markison, Susan L. Lukasik It is certified that error appears in the above-indentified patent and that said Letters Patent is hereby corrected as shown below:

Column 5, claim 1, line 32 "of communication unit;" should be --of the communication unit;--.

Column 6, claim 10, line 16 please delete "further comprises".

Signed and Sealed this

Fifteenth Day of April, 1997

Attest:

BRUCE LEHMAN

Attesting Officer    Commissioner of Patents and Trademarks